UNITED STATES PATENT OFFICE.

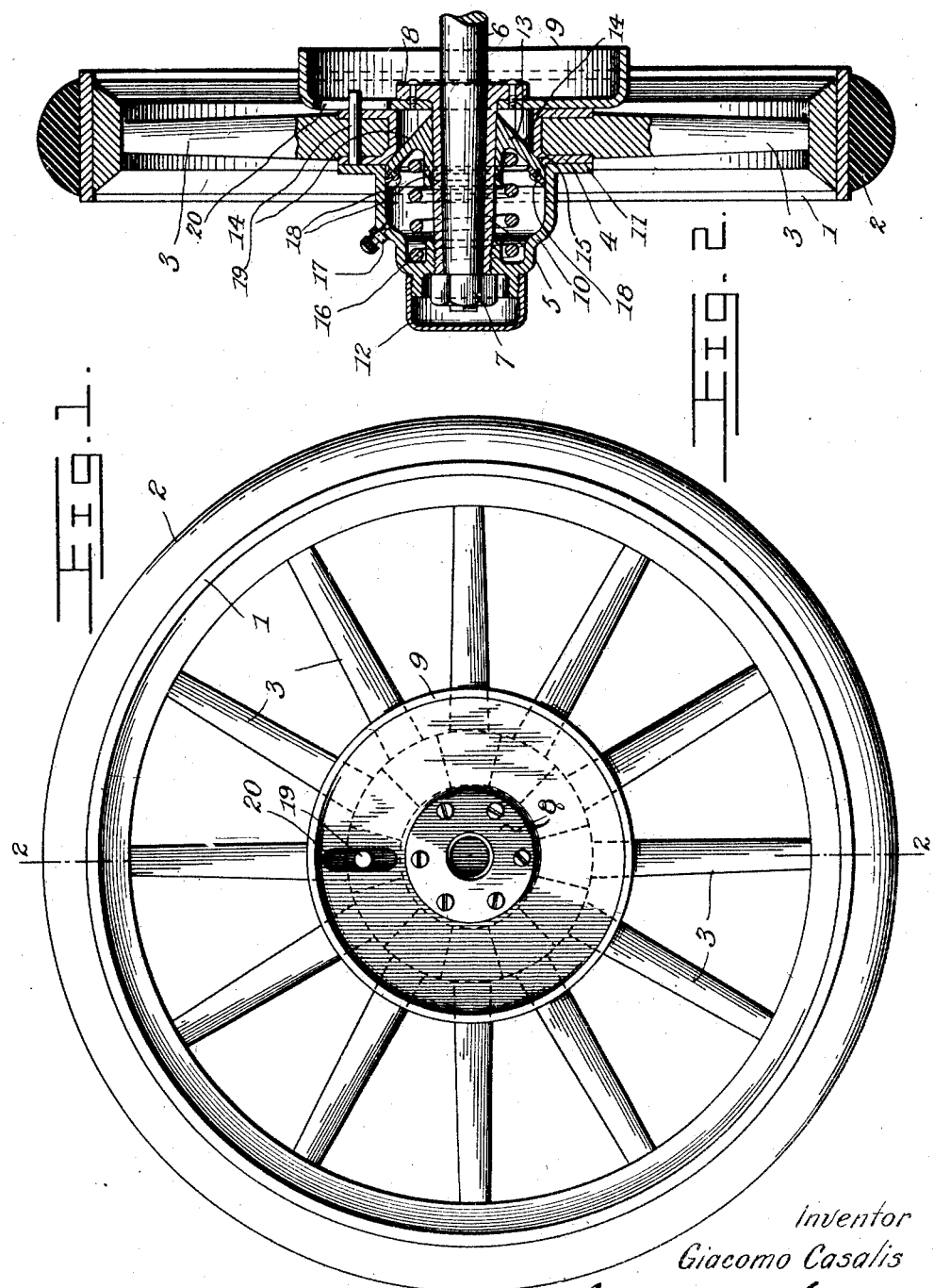

GIACOMO CASALIS, OF VIAUVILLE, QUEBEC, CANADA.

SPRING-WHEEL.

1,366,118.   Specification of Letters Patent.   Patented Jan. 18, 1921.

Application filed January 30, 1919. Serial No. 274,080.

*To all whom it may concern:*

Be it known that I, GIACOMO CASALIS, a subject of the King of Italy, residing at Viauville, Province of Quebec, Canada, have invented certain new and useful Improvements in Spring-Wheels; and I do hereby declare that the following is a full, clear, and exact description of the invention, such as will enable others skilled in the art to which it appertains to make and use the same.

The present invention relates to vehicle wheels and more particularly to a spring wheel adapted to be used on heavy trucks wherein solid tires may be effectively used and have the same effect as that of ordinary pneumatic tires. An object of the present invention is to provide a resilient hub for such wheels which will give and take up any knocks, and jars which are transmitted from the wheel to the vehicle when the same is passing over rough or uneven ground.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a side elevation of the spring wheel embodying the present invention; and, Fig. 2 is a vertical section taken on the line 2—2 of Fig. 1.

Referring now more particularly to the accompanying drawings wherein like and corresponding parts are designated by similar reference characters throughout the several views.

The wheel as herein shown comprises a rim 1 having a solid rubber tire 2 fixed in any well known manner to the outer periphery of the rim and also connected to this rim are the radially extending spokes 3 having their inner ends secured within a flanged inner rim 4 which casing is of a U-shaped configuration in cross section. The hub of the wheel comprises a sleeve 5 which is rotatably fixed upon an axle 6 in the usual manner and is retained in position by means of the nut 7 carried by the axle. One end of this sleeve 5 is provided with a radial flange 8 and secured to this flange 8 is a brake drum 9 over which may pass the brake band. The opposite end of the sleeve 5 is threaded and secured to this threaded portion of the sleeve is a hub plate 10 having a radial extending flange 11 formed with one end thereof which is adapted to rest against one face of the casing 4. A cap 12 is also detachably connected to the hub plate 10 so as to protect and cover the projecting end of the axle 6 and the nut 7. Slidably mounted upon the sleeve 5 is a piston 13 having a cone-shaped face 14 upon which is adapted to ride the bevel edge 15 of the flanged inner rim 4 and the outer peripheral edges of said piston are adapted for engagement with the inner wall of the hub plate 10. Arranged within this hub plate 10 is a coil spring 16 which exerts pressure upon the piston 13 for holding the same in its inward position, or the position as better shown in Fig. 2. A valve-controlled pipe 17 leads to this hub plate 10 whereby air may be pumped therein and act as a pneumatic cushion for the piston 13. This piston 13 is provided with the packing rings 18 so as to prevent any leakage of air around the piston and the hub wall. Carried by the hub plate 10 is a laterally extending pin 19 which projects within a vertical slot 20 formed within the brake drum 9 and through a slot and pin connection the wheel is connected to the hub therefor.

From the foregoing it is obvious that the cushion consisting of the coil spring 16 and the compressed air contained within the hub plate 10 forces the piston 13 inwardly and as the wheel rests upon this piston 13 should the wheel ride upon any unevenness in the ground over which it is traveling it would be caused to move with respect to the hub of the wheel and this piston 13 acts as a resilient support for the wheel thereby taking up any knocks or jars. As the wheel is rotated the hub and the brake drum 9 will be carried therewith and should the brake be applied to the drum 9 the wheel will be held against rotation.

Having thus fully described my invention, what I claim as new and desire to secure by Letters Patent is:

1. A vehicle wheel comprising a rim, a tire carried by said rim, a hub, spokes connecting the rim and hub, said hub comprising a sleeve, a hub plate secured to said sleeve, a piston arranged within said hub plate adapted to slide upon said sleeve, said hub plate adapted to receive air under pressure for establishing a cushion for said piston.

2. A vehicle wheel comprising a rim, a tire carried on said rim, a hub, spokes connecting said rim and hub, a sleeve carried by said hub, a hub plate secured to the sleeve, a piston slidably mounted on said sleeve, a flanged inner rim secured to said spokes and pneumatic means for holding the piston into engagement with the said flanged inner rim.

3. A vehicle wheel comprising an inner rim and outer rim, spokes connecting said rims, a tire for said outer rim, a hub in the form of a sleeve, a hub plate secured to said sleeve, a piston slidably mounted on sleeve and having a cone shaped face, said inner rim formed with a beveled edge adapted to ride on the conical face of said piston, a valve controlled pipe leading to said hub for introducing air under pressure for cushioning said piston and a spring surrounding said sleeve within said hub plate for holding said piston in engagement with the beveled edge of said inner rim.

4. A vehicle wheel comprising a flanged inner rim and an outer rim, spokes having their inner ends secured within said flanged inner rim, a tire connected to said outer rim, a hub in the form of a sleeve, a hub plate secured to said sleeve and having radially extending flanges engaging one face of said inner rim, a piston slidably mounted on said sleeve and having a cone-shaped face, said inner rim formed with a beveled edge adapted to ride upon the conical face of said piston, the outer edges of said piston arranged for engagement with the inner wall of said hub plate, a valve controlled pipe for introducing air under pressure within said hub plate for cushioning said piston and a spring surrounding said sleeve within said hub plate for holding said piston in engagement with the beveled edge of said inner rim.

In witness whereof I have hereunto set my hand.

GIACOMO CASALIS.